United States Patent Office 3,122,474
Patented Feb. 25, 1964

3,122,474
CHLORDIAZEPOXIDE AND CLIDINIUM HALIDE COMPOSITION AND METHOD OF USING SAME
Jens Thuroe Carstensen, Montvale, John James Vance, Park Ridge, and Gerhard Zbinden, Essex Fells, N.J., assignors to Hoffmann-La Roche Inc., Nutley, N.J., a corporation of New Jersey
No Drawing. Filed Oct. 17, 1961, Ser. No. 145,732
7 Claims. (Cl. 167—55)

The present invention relates to therapeutic compositions. More particularly, the present invention relates to therapeutic compositions containing chlordiazepoxide and clidinium halide.

The present compositions are useful in the treatment of gastrointestinal disorders both organic and functional, such as peptic ulcer, hyperchlorhydria, ulcerative or spastic colon, gastritis, duodenitis, biliary dyskinesia, "nervous stomach," irritable spastic colon, anxiety states having gastrointestinal manifestations, pylorospasm, cardiospasm and other functional or organic disorders of the digestive tract.

One of the well known pharmacological manifestations of chlordiazepoxide is its depressant effect on animal behavior. It has now surprisingly been found that clidinium halide, which by itself has substantially no such effect, potentiates the depressant effect of chlordiazepoxide.

The method of treating a human being having a gastrointestinal disorder comprises treating a human being so afflicted with a composition containing chlordiazepoxide (7-chloro-2-methylamino-5-phenyl-3H-1,4-benzodiazepine-4-oxide), or an acid addition salt thereof with a pharmaceutically acceptable acid, and clidinium halide (1-methyl-3-benziloyloxy-quinuclidinium halide).

The acid addition salts with pharmaceutically acceptable acids of chlordiazepoxide that can be employed include the mineral acid salts, e.g. the hydrochloride, hydrobromide, hydroiodide, sulfate, nitrate, phosphate, etc., and organic acid salts such as the arylsulfonates, e.g. benzene and toluene sulfonates, the citrate, tartrate, acetate, lactate, etc.; the hydrochloride salt or the base being preferred.

The term clidinium halide includes clidinium chloride, bromide, and iodide; with the bromide being preferred.

The compositions of the invention are prepared by mixing together the two active components and, optionally, pharmaceutical adjuvants, and forming the resulting mixtures into suitable dosage forms. Compositions suitable for oral administration are the known pharmaceutical forms for such administration, e.g. pressed or coated tablets, capsules, syrups and oily suspensions, and the pharmaceutical adjuvants used in the production of these formulations are those well known to the pharmacist's art, as are also the means of formulation. Suitable oral compositions include capsules and tablets wherein the active ingredients are mixed with inert fillers, e.g. dicalcium phosphate or lactose in the presence of disintegrating agents, for example, maize starch, and lubricating agents, for example, calcium stearate or talc. Oily suspensions for oral use may be formulated in a suitable vegetable oil, for example, arachis oil, which may contain suitable sweetening agents and preservatives.

The active ingredients of the invention can also be used in rectal suppository form by mixing them with suppository adjuvant material, e.g. fatty acid esters of glycerine, or glycols, e.g. cocoa butter, propylene glycol monostearate, etc., by techniques well known to the art.

The ratio of active ingredients can vary over a wide range, for example, from about 0.3 to about 25, preferably from about 2 to about 4 parts by weight of chlordiazepoxide per part by weight of clidinium halide. A typical adult dosage of active ingredients ranges from about 2.5 to about 25 mg., preferably from about 5 to about 10 mg. of chlordiazepoxide and from about 1.0 to about 7.5 mg. of clidinium halide, preferably about 2.5 mg. For example, a hard-shell capsule containing as active ingredients 5 mg. of chlordiazepoxide hydrochloride, and 2.5 mg. of clidinium bromide is administered to a patient three or four times daily. Smaller dosages are, of course, employed for children or elderly or debilitated patients. The above ranges are not critical and dosages outside these ranges can be employed.

The following examples are given to illustrate and not limit the invention.

*Example 1*

The following ingredients are blended together by mixing for 15 minutes in a container:

|  | Mg. |
|---|---|
| Chlordiazepoxide hydrochloride | 5.10 |
| Clidinium bromide | 2.55 |
| Lactose | 162.35 |
| Cornstarch | 30.00 |
| Talc | 5.00 |

The above blend is then passed through a Fitzpatrick comminuting machine and then blended for an additional 5 minutes. The mixture is then filled into a hard-shell capsule.

*Example 2*

The process of Example 1 is carried out using the same quantities of ingredients except that 10 mg. of chlordiazepoxide and 5 mg. of clidinium bromide are employed.

*Example 3*

10 mg. of chlordiazepoxide hydrochloride, 5 mg. of clidinium bromide, 38.45 mg. of white beeswax, 96.1 mg. of polyoxyethylene sorbitan mono-oleate (Tween 80), and 1105.45 mg. of propylene glycol monostearate are mixed together, heated, and shaped in the form of a rectal suppository.

Variations in the process and compositions of the invention can be undertaken by those skilled in the art without departing from either the scope or spirit of the invention.

We claim:
1. A therapeutic composition comprising chlordiazepoxide and clidinium halide.
2. A composition of claim 1 which contains pharmaceutical adjuvant material.
3. A composition of claim 1 wherein the chlordiazepoxide is in the form of a salt of a pharmaceutically acceptable acid.
4. A composition of claim 3 wherein the salt of chlordiazepoxide is the hydrochloride salt and the clidinium halide is clidinium bromide.
5. A therapeutic composition for internal administration in shaped dosage unit form for oral administration comprising chlordiazepoxide and clidinium halide with solid pharmaceutical adjuvant material.
6. A therapeutic composition for internal administration in shaped dosage rectal suppository unit form comprising chlordiazepoxide and clidinium halide with rectal suppository adjuvant material.
7. A process for treating a human being having a gastrointestinal disturbance comprising internally administering to said human being a therapeutic composition comprising chlordiazepoxide and clidinium halide.

References Cited in the file of this patent

Goodman: The Pharmacological Basis of Therapeutics, second edition, 1955, The Macmillan Company, New York, N.Y., page 11.
Bachrach: Chem. Abst., vol. 51, 1957, page 3027d.
Modern Drugs, May 1960, pages 1477–1479.